United States Patent
Bernheim et al.

(10) Patent No.: US 6,547,390 B1
(45) Date of Patent: Apr. 15, 2003

(54) TOP STABILIZED PHOTOCHROMIC LENS SYSTEM

(75) Inventors: Edward A. Bernheim, Corpus Christi, TX (US); Benjamin W. Raglin, Mathis, TX (US)

(73) Assignee: Exxene Corporation, Corpus Christi, TX (US)

( * ) Notice: Subject to any disclaimer, the term of this patent is extended or adjusted under 35 U.S.C. 154(b) by 312 days.

(21) Appl. No.: 09/659,001

(22) Filed: Sep. 11, 2000

(51) Int. Cl.$^7$ .................................................. G02C 7/10
(52) U.S. Cl. ........................... 351/163; 351/44; 351/166
(58) Field of Search ........................ 351/163, 164–166, 351/177, 44; 427/162, 164; 65/30.1, 30.11

(56) References Cited

U.S. PATENT DOCUMENTS

| | | | |
|---|---|---|---|
| 4,268,134 A | * 5/1981 | Gulati et al. ................ 351/163 |
| 5,266,447 A | 11/1993 | Takahaski ................... 430/345 |
| 5,770,115 A | 6/1998 | Misura ........................ 252/586 |
| 5,905,148 A | 5/1999 | Krongauz .................... 544/69 |
| 5,914,193 A | 6/1999 | Ono ............................. 428/451 |
| 6,060,001 A | * 5/2000 | Welch et al. ................ 252/586 |
| 6,102,543 A | * 8/2000 | Melzig ........................ 351/163 |
| 6,297,377 B1 | * 10/2001 | Gupta et al. ................ 544/215 |
| 6,376,040 B1 | * 4/2002 | Usami ........................ 428/64.4 |

* cited by examiner

Primary Examiner—Jordan M. Schwartz
(74) Attorney, Agent, or Firm—G. Turner Moller

(57) ABSTRACT

A method and apparatus for the stabilizing of napthopyran and spiroxazine photochromic dye in a coating or plastic media is presented. As prolonged exposure to light causes degradation of the photochromic properties of the dyes, a two-tiered layering system is utilized in which a hindered amine stabilizer (HALS) and/or an ultraviolet light (UV) absorber, is placed as a clear coat layer above a bottom layer containing the photochromic dyes. The bottom layer is constructed containing the photochromic dyes by either a coating of a surface of a lens or an imbuing of the photochromic dyes into the lens material, and can further optionally contain a HALS and/or UV blocking compound itself.

9 Claims, 1 Drawing Sheet

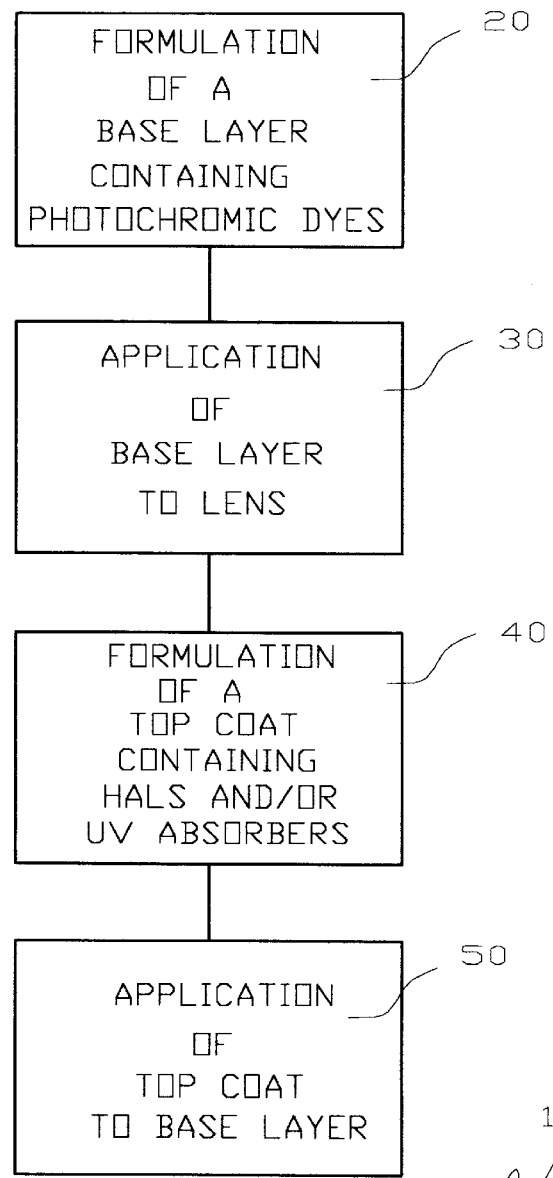
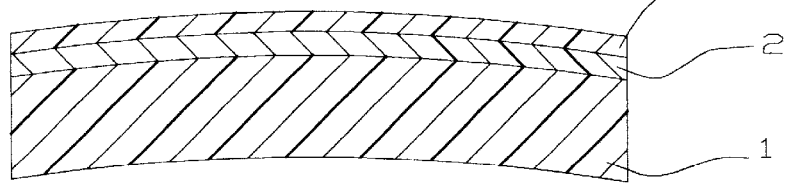

TOP STABILIZED PHOTOCHROMIC LENS SYSTEM

FIELD OF THE INVENTION

The present invention relates to a top stabilized photochromic lens system, a method for making the same and a coating material.

BACKGROUND OF INVENTION

Unfortunately, some would think, our enjoyment of the "Great Outdoors" is often subject to the vagaries Mother Nature throws at us with her different types of weather. Even on a bright sunlit day, for instance, people attempting to enjoy an outdoor activity often have to cope with excessive brightness and glare. To combat this, and increase their outdoor enjoyment, record numbers of people are utilizing sunglasses of one type or another. Many are turning to sunglasses that have a photochromic capability, that is, a capability to darken or lighten based on the level of light intensity. This affords these individual the ability to move from one area of light intensity another area of light intensity without having to continually put-on or take-off their sunglasses. This is especially important for individuals who must wear glasses for corrective reasons.

Currently, however, photochromic lenses are subject to degradation in that the photochromic property of the lens soon wears out. That is, the lenses lose their ability to lighten and darken according to the level of light intensity due to problems of fatigue resistance and oxidation inherently associated with the photochromic compounds utilized. This can lead to a lens which becomes discolored (e.g., spotted), opaque, and/or which even reverses color (e.g., continually dark). It was discovered, however, that through the use of tertiary amine compounds the life of the photochromic compounds could be extended somewhat. U.S. Pat. No. 5,266,447, discloses that photochromic compounds are dissolved or dispersed with a specific tertiary amine compound in a high-molecular compound (i.e., a binder). As disclosed in this patent, the organic photochromic compound is comprised of either a spirooxazine, spiropyran or thiopyran compound, while the tertiary amine compound with which it is mixed may be a hindered amine light stabilizer (HALS) or an ultraviolet (UV) blocker of a variety of types. While effective to a degree, degradation still occurs over time.

Attempts to further stabilize the photochromic compounds beyond the above have failed or so far met with only limited success. For instance, U.S. Pat. No. 5,770,115, relates to a photochromic napthopyran and stabilizer composition. The stabilizer, as disclosed in this patent, is a composition comprised of a polyphenolic antioxidant material, a UV light absorber, and a HALS, each in varying percentages. A sufficient amount of the stabilizer, however, must be used in order to be effective at reducing fatigue resistance of the photochromic material. However, even when the sufficient amount of stabilizer is present with the photochromic material, it is disclosed that only a limited percentage amount of fatigue resistance is achieved.

Another example is U.S. Pat. No. 5,905,148, which relates to polysiloxane copolymers containing both photochromic and light-stabilizing groups incorporated through a hydrocarbon spacer in order to enhance UV light fatigue resistance. The photochromic group is made up of differing spironaphto-oxazines, while the light stabilizing group is made up of HAL's. As this patent is only recently published it remains to be seen as to the effectiveness of the method disclosed therein to reducing UV light fatigue.

In each of the above mentioned patents, however, the photochromic light stabilizers (i.e., the HALS, which also has an anti-oxidant function and UV absorbers) are always intimately mixed with the photochromic compounds or provided in a layer inside the substrate providing the photochromic compounds. This is insufficient to prevent complete, or even substantial, degradation of the photochromic ability of the compound over time in that the spectrum of light radiation is only partially filtered out (or not at all) and is able to impact the dye molecules solely dependent upon their placement in relation to one another in the compound/layer.

SUMMARY OF INVENTION

Accordingly, the present invention provides a method and coating solution by which the life of a photochromic compound can be increased dramatically through a top-down stabilization system. The stabilization system is constructed so that the light radiation must first pass through a protective top-coat before reaching any light-sensitive photochromics in the layers below. In this manner then, those light rays deemed harmful to the properties of the photochromic dyes are effectively filtered out, while only the maxima of the light wave (i.e., that needed to activate the photochromic dye) is passed through.

Thus, in construction, a first layer, the base layer is fashioned containing the photochromic dye to be protected by either a coating of a lens with the dye or an imbuing of the dye into the lens material itself. This layer can also contain anti-oxidants, HALS and/or UV absorbers. On top of this, a second layer, the top layer, is fashioned containing a hindered amine light stabilizer (HALS) and/or a ultraviolet (UV) light absorber. Accordingly, light radiation must first pass through the protective coating containing the HALS and/or UV absorber.

The present invention, including its features and advantages, will become more apparent from the following detailed description with reference to the accompanying drawings.

BRIEF DESCRIPTION OF DRAWINGS

FIG. 1 illustrates a flow chart of a method by which stabilization of photochromic dyes contained in a coating or plastic media may be accomplished, according to an embodiment of the present invention.

FIG. 2 illustrates a two-tiered layering system in which a hindered amine light stabilizer (HALS) and/or ultraviolet (UV) absorber is placed as a clear topcoat layer, according to an embodiment of the present invention.

DETAILED DESCRIPTION

FIGS. 1 and 2 illustrate a method and apparatus for stabilizing photochromic dyes in a top-down two-tiered lens system in which the life longevity of the photochromic dyes is increased by an increase in the fatigue resistance and a decrease in susceptibility to oxidation.

Referring to FIG. 1, a method by which the stabilization of photochromic dyes can be accomplished, in order to extend their useful life against the effects of fatigue and oxidation, is shown. In step 20, a base layer is formulated of any suitable photochromic dye such as disclosed in U.S. Pat. No. 5,914,193, the disclosure of which is incorporated herein by reference. The photochromic materials suitable for use in this invention are materials conventionally used and understood in the art for making photochromic lenses.

Photochromic materials used generally include compounds from the chromene group, the spirooxazine group, the spironaphtho-oxazine group, the spiropyran group, the naphthopryan group, succinic anhydride groups such as 2-(1-(2,5-dimethyl-3-furyl)ethylidene)-3 isopropylidene succinic anhydride, succinimide groups such as 2-(1-(2,5-dimethyl-3-furyl)ethylidene)-3 isopropylidene succinimide, viologen, the triallylmethane group, the diallylethane group and the diazo group. Suitable formulations are shown in Examples 1–3. In this invention, 0.1–10% by weight of a suitable photochromic dye is dispersed in a resin or a combination of resins. The resin (or combination of resins) may be such as a siloxane, silicone, urethane, phenolic, epoxy, acrylic, alkyd, cellulose acetate, cellulose triacetate, cellulose acetate propionate, cellulose acetate butyrate, water soluble and non-water soluble vinyl and vinylidene resins, polycarbonate, polyesters, terephthalates, polystyrenes, and styrene copolymers, polyvinyl butyral and other thermosetting and thermoplastic resins and their monomers. If needed polymerized and non-polymerized plasticizers can also be used. The dyes can also, in some cases, be dispersed in the monomer mixed with molding pellets, or dissolved in a casting material before the formation of an optical plastic object (as described in more detail below).

In step 30, the above materials are dissolved in 10 to 90% by weight solvent such as aromatics, alcohols, ketones, aldehydes, alphatics, chlorinated solvents, ethers, esters and the like and is applied to optical parts such as a lens. The resultant coating is applied to the optical part by spraying, dip coating, flow coating, spin coating, printing methods, or curtain coating. The part is allowed evaporation time of none to one hour. The coating is then cured by heat, plasma, UV light, electron beam, cationic catalysis, or ambient stand. Such techniques ensure sufficient bonding of the solution containing the photochromic dyes to the surface of the optical parts.

Optionally, photochromic dyes and can be incorporated into the surface or the body of an optical lens made of CR-39, polycarbonate, polyurethane, polyacrylates, polyesters, and other polymer substrates. There are many methods currently known in the art to accomplish this. CR-39 is a well known term in the art for a diethylene glycol bis(allyl carbonate) or other allyl esters or combinations thereof. As used herein, the term lens means a light transmitting member which may be in the form of small components sized to be received in goggles or the like or may be in the form of large sheets which are subsequently cut to size. The term lens may or may not imply a visual correction.

After formulation and application of the base layer, in step 40, a top coat is formulated including a protectant selected from the group consisting essentially of a hindered amine light stabilizer (HALS), a polyphenolic antioxidant, an ultraviolet (UV) light absorber and mixtures thereof. The top coat 3 is made out of one or more of the following resin systems from 0.1 to 80% by weight: siloxane, silicone, urethane, phenolic, epoxy, acrylic, alkyd, cellulose acetate, cellulose triacetate, cellulose acetate propionate, cellulose acetate butyrate, water soluble and non-water soluble vinyl and vinylidene resins, polycarbonate, polyesters, terephthalates, polystyrenes, and styrene copolymers, polyvinyl butyral and other thermosetting and thermoplastic resins and their monomers. The resin is dissolved in 10 to 90% by weight solvent of any suitable type to which is added 0.1 to 20% by weight hindered amine light stabilizer and/or a UV absorber at 0.1 to 20% by weight, or mixtures thereof, with 0–5% by weight antioxidant. The topcoat also may contain adhesion promoters and other coating additives. Those skilled in the art will recognize that the resin of the topcoat also provides abrasion resistance.

In step 50 then, the resultant top coating is applied to the base layer and the optical part by spraying, dip coating, flow coating, spin coating, printing methods, and curtain coating. As above, the coating is then cured by heat, plasma, UV light, electron beam, cationic catalysis, or ambient stand. Such techniques ensure sufficient bonding of the solution containing the stabilizers to the coating containing the photochromic dyes.

There are many suitable ways to coat lenses of which dip coating and flow coating are exemplary. In dip coating, the lens is dipped into a filtered batch of coating. The coating is in an overflow tank with constant filtration. A pair of robotic arms dips the lens in the coating batch. The arms then raise the part out of the batch at a constant speed. The part is then cured as above. In flow coating, the filtered coating material is pumped through an adjustable nozzle and a continuous stream of coating is flowed across the top of the lens. The excess coating is allowed to run off the lowermost edge and the part is cured as above.

Referring now to FIG. 2, construction of a top-down two-tiered layering lens system 10 is shown. The layering lens system 10 is designed to overlay an optical part of which a lens 1 is exemplary. The lens 1 may be of any type and may be constructed out of any suitable polymeric material such as CR-39, polycarbonate, polyurethane, polyacrylates, polyesters, and other substrates. The lens 1 may further be a part of any optical system such as eyeglasses, goggles, binoculars, telescope, window, welding or other type face shield or the like. It is to be understood, of course, that the type of lens, its material make-up, and the form in which it is used, are not to be limited to those herein described and that rather any lens through one may look, transparent or otherwise, is acceptable.

On top of the lens 1, the first or base layer 2 is applied. As mentioned above, the base layer 2 is the layer that contains the photochromic dyes. Optionally, this layer may also contain an anti-oxidant if it is so desired, of which tris-3,5 ditertiary butyl-4-hydroxybenzyl isocyanurate, polyphenolics or hydroxyl functional amine are suitable examples. As also mentioned above, such application of the base layer 2 to the lens 1 may be by any number of methods, including impregnation of the base layer 2 into the lens 1. In the case where base layer 2 is to be applied on top of lens 1, it preferably will have a thickness of 0.01–2.0 mils. Alternatively, in the case where the base layer 2, i.e., the photochromic dyes, are to be impregnated in the lens 1, the dye will preferably be evenly dispersed throughout or will at least reach the depth of at least 1 micron. Thus, the base layer 2 may be coated onto the lens 1 or incorporated into the lens 1. The base layer 2 may also have 0.1 to 20% by weight antioxidant dispersed therein. In this case then the combination of lens 1 and base layer 2 can be considered to be the bottom layer after molding, casting, extruding, and other polymer operations.

After construction of the bottom layer (containing the lens layer 1 and the base layer 2 as one entity or not), the protective layer, i.e. the topcoat layer 3, is applied on top of the base layer 2. The stabilizers in the topcoat layer 3 are hindered amine light stabilizers (HALS), UV absorbers or mixtures thereof. A wide variety of hindered amine stabilizers (HALS) may be used with this invention, for example:

1. 8 Acetyl-3-dodecyl-7,7,9,9,-tetramethyl-1,3,8,-triazospiro (4,5)decane-2,4-dione CASRN: 82537-67-5

2. Bis(2,2,6,6,-pentamethyl-4-piperidenyl)sebacate
3. Bis(1,2,2,6,6,-pentamethyl-4-piperdinyl)sebacate
4. Methyl(1,2,2,6,6,-pentamethyl-4-piperdinyl)sebacate
5. bis(2,2,6,6,-tetramethyl-4-piperdinyl)sebacate
6. 2(2'-hydroxy-5-methyl-phenyl benzotriazole
7. [2,2-Thiobis(4-tert-octylphenolato)]-n-butylamine Nickel
8. Mixture of 1,3,5-Triazine-2,4,6-triamine,N,N'''-[1,2-ethanediylbis[[[4,6-bis [butyl(1,2,2,6,6-pentamethyl-4-piperdinyl)amino]-1,3,5-triazine-2-yl]imino]-3,1propanediyl]]-bis[N',N''-dibutyl-N',N''-bis(1,2,2,6,6-pentamethyl-4-piperidinyl) and Demethyl succinate polymer with 4-hydroxy-2,2,6,6,-tetramethyl-1-piperidineethanol
9. Dimethyl succinate polymer with 4-hydroxy-2,2,6,6,-tetramethyl-1-piperidineethanol
10. Mixture of poly[[6-[1,1,3,3,-tetrametyl butyl)amino]-1,3,5-triazine-2,4-diyl][[2,2,6,6-tetramethyl-4-piperidyl)imino]hexamethylene[(2,2,6,6,-tetramethyl-4-piperidyl)imino]] and Demethyl succinate polymer with 4-hydroxy-2,2,6,6,-tetramethyl-1-piperidineethanol
11. Mixture of poly[[6-[1,1,3,3,-tetrametyl butyl)amino]-1,3,5-triazine-2,4-diyl][[2,2,6,6-tetramethyl-4-piperidyl)imino]hexamethylene[(2,2,6,6,-tetramethyl-4-piperidyl)imino]] and bis(2,2,6,6,-tetramethyl-4-piperdinyl)sebacate
12. 1,3,5-Triazine-2,4,6-triamine,N,N'''-[1,2-ethanediylbis[[[4,6-bis[butyl(1,2,2,6,6-pentamethyl-4-piperdinyl)amino]-1,3,5-triazine-2-yl]imino]-3,1propanediyl]]-bis[N',N''-dibutyl-N',N''-bis(1,2,2,6,6-pentamethyl-4-piperidinyl)
13. poly[[6-[1,1,3,3,-tetrametyl butyl)amino]-1,3,5-triazine-2,4-diyl][[2,2,6,6-tetramethyl-4-piperidyl)imino]hexamethylene[(2,2,6,6,-tetramethyl-4-piperidyl)imino]]

and many others.

Similarly, a wide variety of UV absorbers may be employed, such as:
1. 2 hydroxy-4-n-octoxybenzophenone
2. 2-(2-hydroxy-5-t-octylphenyl)benzotriazole
3. 2,2'-Dihydroxy-4-methoxybenzophenone
4. Esters of Aminobenzoic Acid
5. 2-hydroxy-4-methoxy benzophenone.

Thus, the above coatings are applied on top of photochromic optical parts, which, as disclosed above, are made up of any of the following materials: CR-39, polycarbonate, polyurethane, polyacrylate, polysulfone, polyarylates, polyesters, acrylics and/or other substrates. The topcoat layer 3 is preferably 0.1 mils–2 mils in thickness to provide adequate protection to the bottom layer.

As can be seen from the above, the method and apparatus of the present invention allows for filtering of harmful light before contact is made with the photochromic dye. Alternatively, as in the prior art heretofore, if the photochromic dye and stabilizer molecules are in the same layer, statistically the UV light can impact the photochromic dye first and thus do damage to those molecules. However, as disclosed by the present invention, when the stabilizer is in a layer above that of the photochromic dye, some of the harmful UV is blocked before any impacting of the photochromic dye molecules can occur. Thus in turn leads to a longer lasting life of the photochromic dye.

Specific examples of this invention are as follows:

EXAMPLE 1

A resinous base layer coating solution was prepared by mixing vigorously at room temperature 3 parts by weight spirooxazine blue dye, 35 parts by weight toluene solvent, 5 parts by weight liquid bisphenol A diblycidyl ether epoxy resin, 15 parts by weight liquid phenolic resin, 30 parts by weight solid phenylmethyldisiloxane resin and 12 parts by weight of alkyd/melanine resin solution. The solution was stirred for an hour thereby obtaining the resinous photochromic base layer coating material.

A hardcoat top layer coating solution was prepared by added to a mixing vessel 30 parts by weight methyltrimethoxysilanol, 10 parts by weight phenyltrimethoxysilanol and one part by weight glacial acetic acid. To the resulting solution was added, with stirring, an acidified colloidal silica solution including one part by weight glacial acetic acid and 25 parts by weight colloidal silica having a 30% non-volatile content, by weight. The prepared mixture was stirred at room temperature for 16–18 hours. To the reacted siloxane solution was then added 10 parts by weight n-butanol and 25 parts by weight 4-methyl-2-pentanone solvent.

To the top layer coating solution obtained above were added 0.1 part by weight liquid aminoether HALS and 1.0 part by weight of a powdered hindered phenolic antioxidant. Complete dissolution of the stabilizers was observed within 15 minutes of stirring at room temperature.

Plano lenses of CR-39 resin were etched, neutralized and solvent cleaned as is customary in the trade. The lenses were mounted vertically and lowered into a filtered volume of the base coating solution obtained above. Upon withdrawal, the lenses were cured in a thermal convection oven at 122° for 15 minutes. After cure, the lenses were allowed to cool to room temperature and the process was repeated with the hardcoat top layer coating solution. All lenses possessed very little initial tint and displayed an extremely rapid darkening and lightening response using ambient, noon solar conditions. Long term and accelerated weathering tests are shown in Table I. In addition, the lenses possessed excellent abrasion resistance and surface hardness.

EXAMPLE 2

A modified base layer was prepared using the same technique as in Example 1 except that a napthopyran based purple was substituted for the blue spirooxazine. A powered, hindered polyphenolic antioxidant in the amount of 2.0 parts by weight was then stirred into the solution to further stabilize the napthopyran dye. Upon complete dissolution, the composition was filtered and prepared for application.

The hardcoat layer from Example 1 was modified by adding 1.5 parts by weight of a pelletized oligomeric triazine-functional HALS, 0.5 parts by weight of a powered hindered polyphenolic antioxidant, and 1.8 parts by weight of liquid benzotriazole-based ultraviolet absorber. The solution was stirred for 30 minutes and the composition filtered through a 0.5 micron nylon membrane. The base coat and the top coat were applied to a CR-39 lens was in Example 1. The napthopyran purple exhibited excellent life and depth of color, as summarized in Table I.

EXAMPLE 3

To produce a coating composition compatible with polycarbonate lenses, the toluene in the base layer coating solution in Example 1 was replaced with a mixture of equal parts of isobutanol, xylene and diacetone alcohol. A benzophenone UV absorber in the amount of 3.0 parts by weight was stirred into the solution.

It was desired to produce a top layer coating with great flexibility for use on thin plastics such as window glazing, goggle inserts and the like. To this end, 58 parts by weight of n-butanol were added to 2 parts by weight of a green spirooxazine dye, 0.2 parts by weight of a phenolic antioxidant, and 30 parts by weight of a glycouril-formaldehyde melamine resin having anon-volatile content of 88% by weight. The mixture was stirred and then 10 parts by weight of a polyol formed by the condensation of sucrose and diethylene glycol was added to the solution.

To 100 parts by weight of the top layer coating obtained above was added while stirring: 0.1 parts by weight octadecyl-functional phenolic antioxidant, 0.8 parts by weight dihydroxylalkyl amine light stabilizer, 0.2 parts by weight of liquid aminoether HALS and 1.7 parts by weight of liquid methoxybenzophenone absorber.

An extruded poly(bisphenol A carbonate) plastic sheet 0.08" thick was selected. The filtered base coat composition obtained above was flow coated across a section of the polycarbonate sheet. The excess coating solution was allowed to flow off the plastic and then the coated sample was placed into a convection oven for 25 minutes at 120° C. Upon completion of the cure cycle, the sample was allowed to cool and coated similarly with the flexible top layer coating solution obtained above. The top layer was cured for 45 minutes at 120° C. The finished lens possessed excellent MEK scrub resistance, 8H pencil hardness and less than 1.0% optical haze. The prepared sample displayed very good flexibility. The photochromic response and longevity are summarized in Table I.

Table I is a summary of tests of lens protected by this invention with unprotected photochromic lens:

Table II is a summary of tests of lens protected by this with unprotected photochromic lens:

TABLE II

| ID | dyes | time exposed, hrs | initial change in transmittance | change in transmittance after QUV exposure | change in transmittance after solar exposure |
|---|---|---|---|---|---|
| blue | pal purple | 96 | 36–38 | 37–38 | 13–15 |
| blue* | pal purple | 250 | 36–38 | 37–38 | 20–26 |
| aquamarine | sea green | 96 | 30–33 | 0–5 | 10–12 |
| aquamarine* | sea green | 250 | 30–33 | 13–15 | 19–21 |
| orange | orange | 96 | 30–36 | 9–17 | 5–11 |
| orange* | orange | 250 | 30–36 | 20–21 | 15–17 |
| yellow | solar yellow | 96 | 10–13 | 0–4 | 0–4 |
| yellow* | solar yellow | 250 | 10–13 | 6–8 | 4–8 |
| purple | red 2 | 96 | 39–48 | 11–17 | 0–3 |
| purple* | red 2 | 250 | 39–48 | 28–33 | 15–20 |

*Photochromic lenses, protected by this invention, were exposed to UV-A radiation for 15 hours a day for 250 hours. Identical lens samples were exposed to ambient, solar radiation for 90 days. After exposure, lenses of this invention were much less degraded than their unprotected counterparts which received only 96 hours QUV exposure and 90 days solar radiation.

It will be noted that all of the lenses protected with this invention were exposed for 250 hours in either a QUV cabinet or to solar radiation and produced lenses that, after the exposure were much less degraded than their unprotected counterparts.

TABLE I

| | | initial transmittance | | | QUV transmittance | | | 90 day solar transmittance | | |
|---|---|---|---|---|---|---|---|---|---|---|
| ID | dye | light | dark | delta | dark | light | delta | dark | light | delta |
| blue | spiro | 77 | 38 | 39 | 90 | 78 | 15 | 93 | 78 | 15 |
| blue* | spiro | 75 | 38 | 37 | 83 | 56 | 27 | 83 | 56 | 27 |
| purple | naptho | 95 | 49 | 46 | 92 | 78 | 14 | 98 | 97 | 1 |
| purple* | naptho | 94 | 47 | 47 | 92 | 60 | 32 | 94 | 77 | 17 |
| aqua | spiro | 87 | 54 | 33 | 81 | 77 | 4 | 95 | 83 | 12 |
| aqua* | spiro | 88 | 45 | 43 | 85 | 71 | 14 | 82 | 60 | 22 |
| orange | naptho | 96 | 60 | 36 | 84 | 73 | 11 | 90 | 80 | 10 |
| orange* | naptho | 95 | 60 | 35 | 88 | 68 | 20 | 90 | 74 | 16 |
| yellow | naptho | 98 | 86 | 12 | 97 | 95 | 2 | 96 | 94 | 2 |
| yellow* | naptho | 99 | 86 | 13 | 97 | 89 | 8 | 97 | 90 | 7 | light - transmittance of the light colored lens, before UV or solar exposure.
dark - transmittance of the darkened lens, after UV or solar exposure.
*Photochromic lenses, protected by this invention, were exposed to UV-A radiation for 15 hours a day for 250 hours. Identical lens samples were exposed to ambient, solar radiation for 90 days. After exposure, lenses of this invention were much less degraded than their unprotected counterparts which received only 96 hours QUV exposure and 90 days solar radiation.

Luminous Transmittance is a measure (%) of the amount of visible light transmitted through the lens. A change in the ability to transmit light represents a darkening or lightening of the lens.

Delta is the difference between the transmittance of the light-colored lens and the transmittance of the dark color lens, after UV exposure. The magnitude of this value is a measure of the ability of the lens to change color in response to UV radiation.

QUV is a tradename for an accelerated weathering test chamber—a UV (fluorescent) and Condesation exposure cabinet manufactured by Q-Panel Co. During testing of this invention, the condensation/heating portion of the QUV apparatus was disabled.

The protected optical part of this invention is typically made in large sheets when are then cut to provide lenses of a desirable size and shape, e.g. to fit into eyeglasses, goggles, binoculars, telescope, window, welding or other type face shields or the like. The lens is then incorporated into a frame which is designed to cover at least part of a human face with the protective layer exposed to sunlight, i.e. the protective layer faces away from the human face and there is no photochromic dye material outside of the protective layer. In other words, the protective layer includes a first side juxtaposed to the photochromic dye rich material and a second side facing away from the human face which does not juxtapose a photochromic dye rich material. This construction allows sunlight to be filtered by the protective layer before reaching any photochromic dye that is degraded by sunlight.

It will accordingly be seen that an important feature of this invention is the provision of a solution for coating an optical part having a photochromic dye incorporated therewith. The coating solution consists essentially of 10–90% by weight resin; 10–90% by weight solvent; a protectant selected from the group consisting essentially of 0.1–20% by weight hindered amine light stabilizers, 0.1–20% UV absorbers, and mixtures thereof and 0–5% antioxidant.

In the foregoing description, the method and apparatus of the present invention have been described with reference to a number of examples that are not to be considered limiting. Rather, it is to be understood and expected that variations in the principles of the method and apparatus herein disclosed may be made by one skilled in the art and it is intended that such modification, changes, and/or substitutions are to be included within the scope of the present invention as set forth in the appended claims. The specification and the drawings are accordingly to be regarded in an illustrative rather than in a restrictive sense.

We claim:

1. An optical part including an optical substrate providing a photochromic dye, a light transmitting protective layer on the substrate, the protective layer consisting essentially of 75–99.9% by weight of a binder, 0.1–20% by weight of a protectant selected from the group consisting essentially of a hindered amine light stabilizer, an ultraviolet light absorber, and mixtures thereof and 0–5% by weight antioxidant so that selected wave lengths of light passing through the protective layer are filtered before they reach and destabilize the photochromic dye.

2. The optical part of claim 1 wherein the optical substrate is a lens.

3. The optical part of claim 2 wherein the substrate is selected from the group comprising CR-39, polycarbonate, polyurethane, polyacrylates and polyesters.

4. The optical part of claim 1 wherein the photochromic dye is incorporated in a coating applied to the substrate.

5. The optical part of claim 1 wherein the photochromic dye is incorporated within the substrate.

6. The optical part of claim 1 wherein the photochromic dye consists of 90–99.9% by weight resin, and 0.1–10% by weight of a photochromic dye.

7. The optical part of claim 1 wherein the optical substrate is a sheet.

8. The optical part of claim 1 wherein the optical part is a lens, and further comprising a device covering at least part of a human face incorporating the lens.

9. The optical part of claim 8 wherein the protective layer has a first side juxtaposed to the substrate and a second side away from the human face so that sunlight impinges first on the protective layer and then on the photochromic dye, the second side of the protective layer being free of photochromic dye.

\* \* \* \* \*